(12) United States Patent
Toelken (10) Patent No.: US 6,512,839 B1
(45) Date of Patent: Jan. 28, 2003

(54) ULTRASOUND SEX DETERMINATION OF AVIAN HATCHLINGS

(75) Inventor: L. Taizo Toelken, Neosho, MO (US)

(73) Assignee: Ultra-Hatch, Inc., Neosho, MO (US)

( * ) Notice: Subject to any disclaimer, the term of this patent is extended or adjusted under 35 U.S.C. 154(b) by 0 days.

(21) Appl. No.: 10/080,277

(22) Filed: Feb. 20, 2002

Related U.S. Application Data (60) Provisional application No. 60/270,522, filed on Feb. 21, 2001.

(51) Int. Cl.[7] .................................................. G06K 9/00
(52) U.S. Cl. ...................................... 382/110; 604/407
(58) Field of Search .................. 119/6.8, 840; 600/407; 382/110

(56) References Cited

U.S. PATENT DOCUMENTS

| | | | | |
|---|---|---|---|---|
| 3,550,586 A | * | 12/1970 | Balamuth | 382/110 |
| 3,941,122 A | | 3/1976 | Jones | 128/24 A |
| 3,994,292 A | | 11/1976 | Goodwin | 128/172 |
| 4,191,130 A | | 3/1980 | Musgrave | 119/22 |
| 4,311,044 A | | 1/1982 | Marshall et al. | 73/146 |
| 4,417,663 A | * | 11/1983 | Suzuki | 209/509 |
| 4,681,565 A | | 7/1987 | Gourlandt | 604/115 |
| 4,895,157 A | * | 1/1990 | Nambu | 324/309 |
| 5,170,698 A | | 12/1992 | Kirk | 99/472 |
| 5,195,925 A | | 3/1993 | Gorans | 452/166 |
| 5,199,380 A | | 4/1993 | Keromnes et al. | 119/22 |
| 5,371,483 A | | 12/1994 | Bhardwaj | 333/149 |
| 5,402,786 A | * | 4/1995 | Drummond | 324/318 |
| 5,617,782 A | | 4/1997 | Thomas | 99/500 |
| 5,651,731 A | | 7/1997 | Gorans et al. | 606/164 |
| 5,679,514 A | * | 10/1997 | Baker | 435/6 |
| 6,029,080 A | * | 2/2000 | Reynnells et al. | 356/52 |
| 6,244,214 B1 | | 6/2001 | Hebrank | 119/6.8 |
| 6,396,938 B1 | * | 5/2002 | Tao et al. | 209/509 |
| 6,424,857 B1 | * | 7/2002 | Henrichs et al. | 424/9.51 |

OTHER PUBLICATIONS

Embrex, Inc., Press Release, entitled "Embrex Awarded U.S. Patent for its Poultry Gender Sort Technology," (Business Wire: Mar. 8, 2001).

Bill Spindle, "Masters of a Dying Art in Japan get together Yearly to Sex Chicks," (Wall Street Journal: Feb 7, 2001), p. A1, continuing over onto p. A12.

Dr. Marianne Chat, "Burn Care: Eliminating the Waiting Game," of University of California at Irvine's serial *Milestones in Medicine*, (copyrighted 2001).

Brochure of SecondWave Systems, Inc., entitled "Non–contact Ultrasound," (copyrighted 1999).

Operating Manual of Ultramark 4A System, sheets 4–1 through 4–3 of Chapter 4 entitled "System Control Descriptions," not dated.

Selections from S.E. Solomon, *Egg & Eggshell Quality* (Iowa State Univ. 1997):—Chap. 5 "Surface defects?," Chap. 6 "Physiochemical changes in oviducal architecture," & Chap. 9 "Reinterpretation of eggshell strength.".

* cited by examiner

*Primary Examiner*—Charles T. Jordan
*Assistant Examiner*—Judith A. Nelson
(74) *Attorney, Agent, or Firm*—Jonathan A. Bay

(57) ABSTRACT

A method for making a sex determination in avian hatchlings involves the following activities. A process line is equipped to process an endless plurality of hatchlings. The process line has an ultrasound inspection station for the hatchlings. The ultrasound inspection results are analyzed to find the presence of given sex-determinative structure for each hatchling. If the given sex-determinative structure is found then a first category assignment is made. The hatchling is sorted according to its category assignment. The category assignments might number two or three or so including positively-identified one sex, positively-identified other sex, and default to waste for any of various reasons.

20 Claims, 7 Drawing Sheets fig. 3

ULTRASOUND SEX DETERMINATION OF AVIAN HATCHLINGS

CROSS-REFERENCE TO PROVISIONAL APPLICATION(S)

This application claims the benefit of U.S. Provisional Application No. 60/270,522, filed Feb. 21, 2001, which is incorporated herein in full by reference.

BACKGROUND OF THE INVENTION

1. Field of the Invention

The invention relates to harm-free inspection of avian hatchlings to make a gender finding and, more particularly, to using ultrasound inspection to make the gender finding and in consequence of the finding sorting the hatchlings in at least two and preferably three or more categories.

A number of additional features and objects will be apparent in connection with the following discussion of preferred embodiments and examples.

2. Prior Art

It is known to use nuclear magnetic resonance imaging (MRI) of avian eggs to make a sex and possibly fertility determination. U.S. Pat. No. 6,029,080—Reynnells et al. However the process of nuclear magnetic resonance imaging (MRI) of avian eggs to make a non-invasive determination of any kind will be beset with problems.

The MRI equipment requires a very high capital investment and has unproven reliability. The economics of egg producing operations do not allow purchase of a back up system or expensive components in case of failures of the main system. The MRI equipment is stationed to catch eggs in transit during egg transfer operations. Egg transfer operations cannot be idled for even thirty (30) minutes or else thousands to tens of thousands of eggs will spoil.

The MRI image is in fact a virtually perfect slice of the egg through a given plane. However, the internal structures that allow a sex or fertility determination are hard to make out in such a perfect slice. Indeed U.S. patent of Reynnells et al. discloses quite distinctly how the egg must be oriented in a just so orientation, and then multiple images are taken on 0.5 mm spacings (ie., 50 slices per inch). After that, the best slice has to be determined because next, analysis requires finding a reference marker (eg., eyes or eye sockets) away from which origin a succeeding finding of the sex marker is paced.

It is reported that the MRI process requires cooling the eggs temporarily until the images are obtained. Eg., U.S. Pat. No. 6,029,080—Reynnells et al. Seasoned egg production workers are skeptical of that. Long custom has been to keep eggs in a carefully regulated environment of controlled warmth and humidity. Also, the nuclear MRI radiation just might be worrisome as a death ray to the germ of fresh eggs from the brood farm.

If egg production operations would consider adopting MRI techniques, they'd next have to face paying MRI certified operators at pay scales really unfamiliar in the egg production world.

In sum, the MRI process appears to be an ivory tower solution to a down and dirty problem. State of the art brood farms are known to produce a million (1,000,000) eggs a day. Yet margins are razor thin. The requirement for reliability in the methods relied on is paramount.

The investment in an MRI inspection process costs top dollar. Yet if the MRI inspection equipment goes out then the whole efficiency of the operation is impeded. If an MRI apparatus including its coil went down, it would simply have been cost prohibitive to own a back up in case of failures. There would be no reserve equipment to switch to or change out to in case of failures.

Given the foregoing seasoned veterans are skeptical of the feasibility of nuclear magnetic resonance imaging in poultry operations. The technology appears best left in hospitals where the throughput rate might be one to ten (1 to 10) patients an hour rather than millions of eggs a day.

Nevertheless, efficiency and optimization are paramount in poultry operations. Accordingly, poultry operations would benefit from any reasonably cost-justifiable method for automated, hatchling gender determination.

What is needed is an improvement in determining hatchling gender which overcomes the shortcomings of the prior art.

SUMMARY OF THE INVENTION

It is an object of the invention to examine avian hatchlings by ultrasound probes to make a finding of gender.

It is another object of the invention to examine avian hatchlings with an ultrasound signal targeted at the vent or cloaca of the avian hatchlings in order to search for organs or anatomical structure there characteristic of gender.

It is an additional object of the invention to analyze the information signal with automatic processing means to obviate the need for human intervention in making the gender determination.

It is an alternate object of the invention to utilize the automatic processing means to provide control for automatic sorting of the examined hatchlings to thereby obviate the need for human intervention with both determining and sorting avian hatchlings by gender.

It is a further object of the invention to accomplish the foregoing with either contact or non-contact ultrasound transducers operating in pulse-echo mode.

These and other aspects and objects are provided according to the invention in a method and apparatus for sorting avian hatchlings by gender comprising the following steps. Preliminarily, there is the provision of a plurality of avian hatchlings. Ultrasonic energy is beamed at the vent or cloaca of each hatchling to produce a detectable signal from anatomical structure associated with the vent. As a result, gender is determined from analysis of the signal by one or more processing units and then sorting is accomplished on that determination by one or more of the same processors.

By one alternate embodiment of the invention, the step of beaming ultrasonic energy comprises contacting a contact probe against the vent to operate in pulse-echo mode. This step of contacting the contact probe against the vent might further include providing an intermediate, flowable medium therebetween to eliminate air and/or provide an acoustic couple between the probe and couple.

In an alternative embodiment of the invention, the step of beaming ultrasonic energy comprises aiming a non-contact pulse-echo probe at the vent. By either embodiment, the detectable signal is preferably analyzed for the presence or absence of a characteristic of male gender. Typically the characteristic of male gender comprises structure of the phallus.

Further other detail of the invention might include hanging the hatchlings under examination as upside down from an apparatus provided with a source for beaming the ultrasonic energy at the vent. Whereby the apparatus automatically sorts the hatchlings to respective output conveyors by dropping the examined hatchlings down chutes which direct them toward respective single sex conveyors or the like. Certain ones of the hatchlings might be determined as defective and thus directed toward a waste conveyor or the like. Indeed, for industries concentrating in egg-laying operations, every hatchling not qualified as a female free of defects might be removed as waste.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
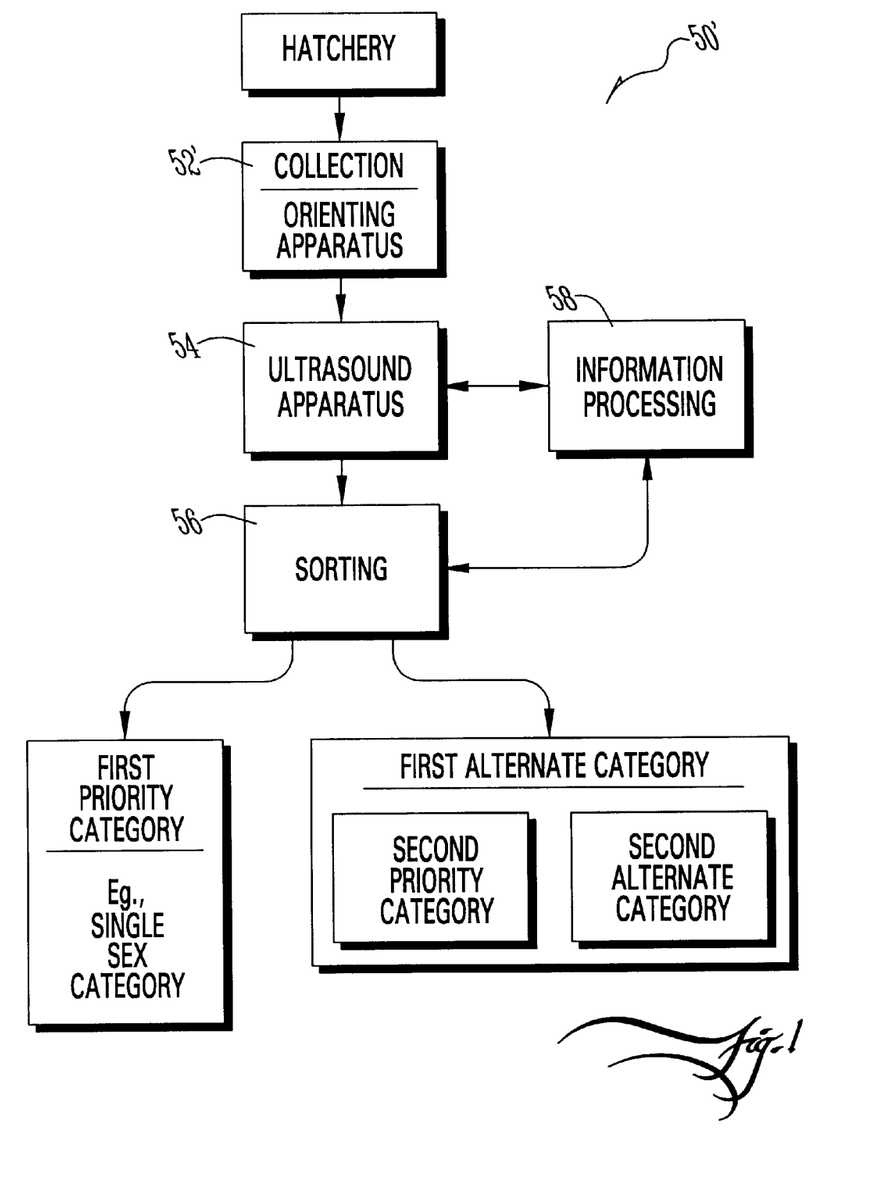
FIG. 1 is a block diagram flow chart of a method in accordance with the invention that provides an ultrasound sex determination of avian hatchlings.

FIG. 1 is a block diagram flow chart of a method 50' in accordance with the invention that provides an ultrasound sex determination of avian hatchlings (eg., indicated by reference numeral 70 in FIGS. 3 through 6).

Briefly, hatchlings are collected immediately as practicable after hatching at the hatchery. Nowadays, a hatchling's first day is fairly severe. Hatchlings undergo an intermediary process while they are transferred from the hatchery management area during which they might be de-beaked, de-clawed, injected with vitamins and manually vent-sexed. Typically, that is, sexing is achieved by a manual vent-sexing examination in accordance with the prior art. Other prior art manual ways to sex include feather sexing but this limited to special breeds that allow such sexing.

Workers skilled in the practice of manual vent-sexing give each hatchling an individual inspection to make a sex determination. This allows the worker to sort the hatchling according to sex. The method 50' in accordance with the invention preferably automates the sexing process as well as the sorting operation. The method 50' preferably is arranged to operate on the hatchlings contemporaneous with any of the conventional de-beaking, de-clawing and/or injection operations.

FIG. 1 shows that hatchlings (not indicated in FIG. 1 but see 70 in FIGS. 3 through 6) are collected and supplied to a generalized orienting apparatus 52' including disposition to an ultrasound station 54. Ultrasound inspection transpires, the results of which are analyzed by a processor 58. The processor 58 is configured to make a determination based on hatchling anatomy and/or structure that is associated with the hatchling's vent or, in more technical language, the "cloaca" (and indicated by reference numeral 72 in, eg., FIG. 3). Preferably the ultrasound information is processed for a first determination of, say, whether anatomical structure or organs characteristics of males are present or absent. The preferred organs or structure for this determination are preferably the male "tokki," which might be reckoned as structure of the phallus.

Figure 7:
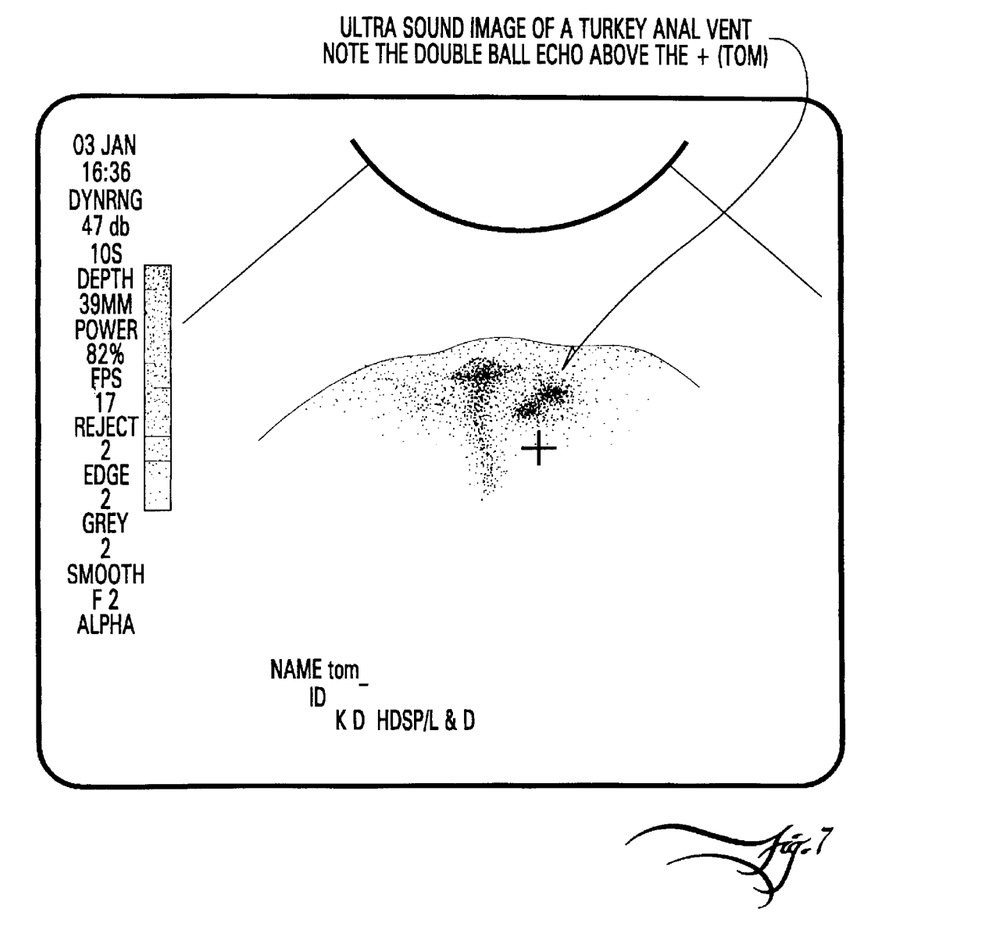
FIG. 7 is an ultrasound image acquired by the method in accordance with the invention showing the phallus of a male avian hatchling.

By way of background, the custom of avian vent-sexing extends back to an early origin with Japanese practitioners who over time refined the practice to a high level of skill. Accordingly, terminology common in the field today shows these Japanese roots, and the particular structure on which to base a manual vent-sexing determination is referred to as "tokki." Presumptively "tokki" corresponds to structure of the phallus. What this structure appears like in a tom as in FIG. 7 is miniature testes gonads. However, it is also believed that the true testes gonads of turkeys are deeper inside the abdomen than the "tokki" structure searched for by vent-sexing examiners. The "tokki" structure may actually be intermediate sperm reservoirs downline from the true testes gonads. Regardless, this "tokki" structure is found retracted just inside a peripheral portion of the alimentary vent in male avian hatchlings. The presence or absence of the "tokki" structure has been used by vent-sexing examiners successfully for many long years to determine sex of first-day hatchlings, and with a very high degree of accuracy.

To return to the method 50' in accordance with the invention, FIG. 1 shows that hatchlings (eg., 70) are submitted to an ultrasound examination station 54. At which station, a beam of ultrasonic energy is aimed at the hatchling's vent (eg., 72) to produce an examination signal. The processor 58 analyzes the detected or examination signal for the presence or absence of the "tokki" or otherwise the pertinent structure of the phallus. If such structure of the phallus is present, the processor 58 can determine that the specimen 70 is male, assign it to a priority category (eg., first priority category), and thereby sort out male specimens from the rest of the population. If on the other hand the processor 58 fails to find the presence of the "tokki" or corresponding structure of the phallus, the processor 58 can assign the as-yet indeterminate specimen 70 into an alternate category (eg., first alternate category). The processor 58 may simply conclude that all "not-male" specimens are female. Alternatively, the processor 58 might vary the ultrasound source (eg, 80 or 82 in FIGS. 3 or 6) operability and/or vary the method of researching the detected ultrasound information in order to make a positive determination of female structure and/or anatomy such as by finding the ovary gonad(s).

If the processor 58 successfully finds female structure and/or anatomy, then the processor 58 will assign the specimen 70 into another priority category (eg., second priority category). All specimens 70 that can be neither sexed as male nor female get assigned into a subordinate alternate category (eg., second alternate category). Preferably the second alternate category corresponds to waste.

In the drawings, the reference to first and second priority categories and then the corresponding matching thereof in this written description to male and female gender is done merely for convenience and accordingly does not limit the invention to such.

The processor 58 might be programmed to search not only for the presence of sex markers (so that a sex assignment can be made), but also the absence of defects. That way, if the processor 58 finds a defect in the ultrasound information, the processor 58 can assign the specimen 70 to a waste category. Whichever category is the waste category changes with the needs of a given industry. For example, perhaps the first priority assignment is male specimens, and therefor the first alternate category is presumptively females. Even though the female specimens have only been sexed by default, they are often the desirable specimens. That is, the males are waste in view of industries concentrating in egg-producing operations. In consequence, all positively identified males and positively identified defects might be assigned to the first priority category, which is waste. All other specimens by default would be assigned to the first alternate category, which are the keepers.

Whereas FIG. 1 shows perhaps two and/or otherwise three dispositions for hatchlings 70, this is done so merely for convenience in the drawings and thus the invention is not limited to sorting the hatchlings into any definite number of categories. There can be third, fourth, fifth and so on corresponding pairs of priority and alternate categories.

Figure 2:
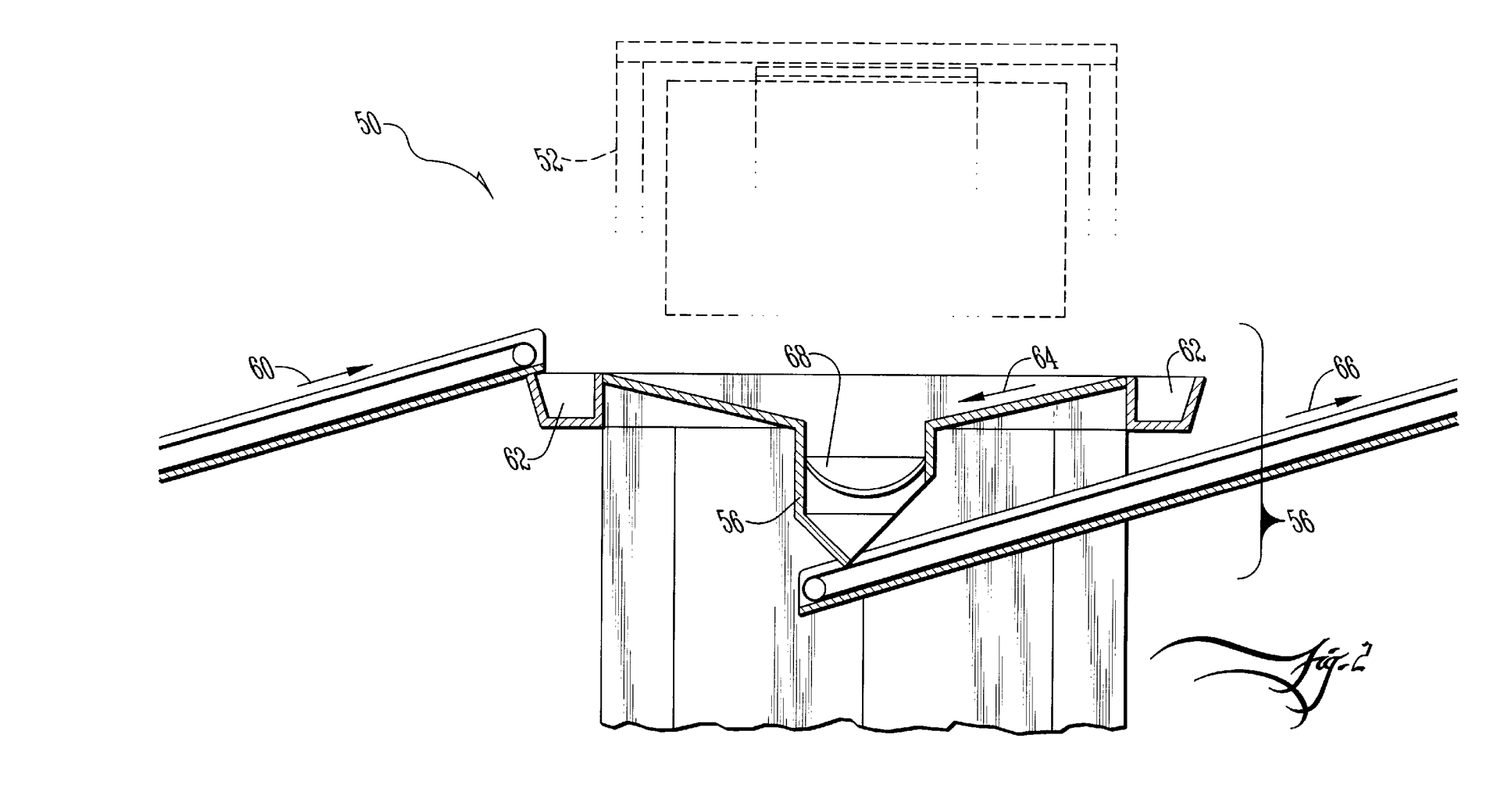
FIG. 2 is an elevational sectional view taken along a vertical plane of symmetry through an ultrasound and sorting station for implementing the method in accordance with the invention, and comprising an infeed conveyor, an intake carousel, an ultrasound station, and output chutes to respective output conveyors.

FIG. 2 shows one example embodiment of an orienting, ultrasound and sorting apparatus 52, 54 and 56. In FIG. 2, an input conveyor 60 supplies hatchlings up a ramp for deposit into an intake carousel 62 (eg., annular conveyor). Workers (not shown) stationed surrounding the carousel 62's trough fish out individual specimens (not shown, but see 70 in FIG. 3) by hand and plug the specimens 70 into one or more open sockets in various stations of the overhead turret 52. That is, in some instances the hatchlings 70 are plugged into the sockets for their beaks to trimmed down/off by intense heat or light energy (not shown). In other instances, the hatchlings are plugged into sockets where they receive an injection of vitamins and/or other medicines (again not shown). In still other instances, the hatchlings are hung upside down by a pair of ankle clips (eg., 55) as shown for example in FIG. 3, for microwave declawing or the like.

Figure 3:
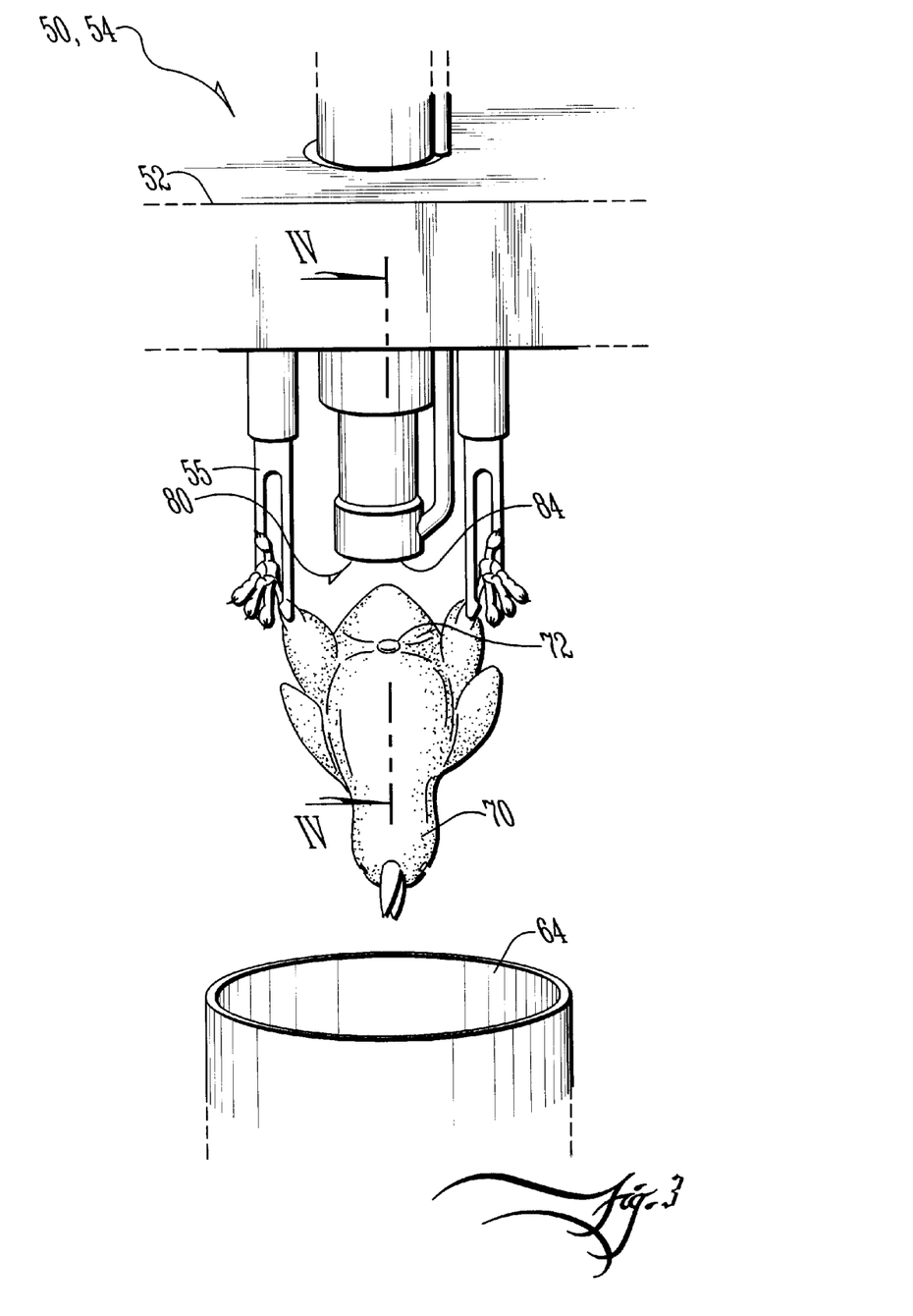
FIG. 3 is an enlarged perspective view of an ultrasound station in accordance with the invention.

In FIG. 3, a worker (not shown) has mounted the hatchling 70 upside down with belly oriented outward (ie., towards the worker, again who is not shown). Such ankle clips 70 are conventional and are characteristic of such a station 54 as this where the hatchling 70's claws might be trimmed down/off by microwave energy (this process is not shown). Typically this station 54 would include the provision of a suction head (not shown) for suctioning up the hatchling 70's claws into a field of microwave energy which does the job. At the end of the microwave job, the main apparatus 52. 54, 56 and 58 automatically opens the clips 55 and the hatchling 70 can be retrieved by the worker or, more preferably, allowed to drop into a collector chute 64. It is a preferred aspect of the invention that the ultrasound sex determination of the hatchling be performed substantially concurrently with the microwave de-clawing process.

To return to FIG. 2, it illustrates the following aspects of an example sorting process 56. Again, the ramp of the input conveyor 60 supplies an endless infeed of hatchlings (eg., 70, although not shown in FIG. 2) for deposit into the intake carousel 62. Workers fish out individual specimens (eg. 70, not shown) for plugging into the various sockets or stations of the overhead turret 52 for various operations including without limitation de-beaking, injection and de-clawing. FIG. 3 shows an example de-clawing station 54 modified for ultrasound inspection in accordance with the invention. In FIG. 3, the hatchling 70 is retained by ankle clips 55 as shown as above a collector chute 64.

Following de-clawing and/or ultrasound examination, the examined hatchling 70 is released into the waiting collection chute 64. Returning to FIG. 2, the examined hatchling (eg., 70) might be imagined as dropping down the collector chute 64 which FIG. 2 illustrates as a wide funnel mouth. Preferably the collector chute 64 is provided with one or more deflector paddle(s) 68 at or below the throat of the funnel. The deflector paddle(s) 68 is(are) controllable by the processor 58. Accordingly, the processor 58 can switch the one (or more) paddle(s) 68 into various arrangements based on the ultrasound examination such that the examined hatchling 70 is outputted to a respective output conveyor 66 (only one shown). Preferably there are two and more preferentially three output conveyors 66 (again only one shown in FIG. 2).

Given the foregoing, the one or more deflector paddles 68 switch among various positions to output the hatchlings 70 to various output conveyors 66 based on the results of the ultrasound examination. One output conveyor might correspond to positively identified males, another output conveyor might correspond to residuary specimens not positively identified as male. Alternatively, the one output conveyor might correspond to positively identified males and positively identified defects (hence waste), as the other output conveyor services residuary specimens not positively identified as male or defect (ie., presumptively healthy egg-layers).

A third conveyor might be utilized such that the one or the other output conveyors corresponds to male or female hatchlings 70 as the third conveyor removes waste. Each specimen 70 outputted as any of male, female or waste might be positively identified for that output category, or might represent a residual specimen assigned that category by default in deference to positive identification for any of the other two categories.

Figure 4:
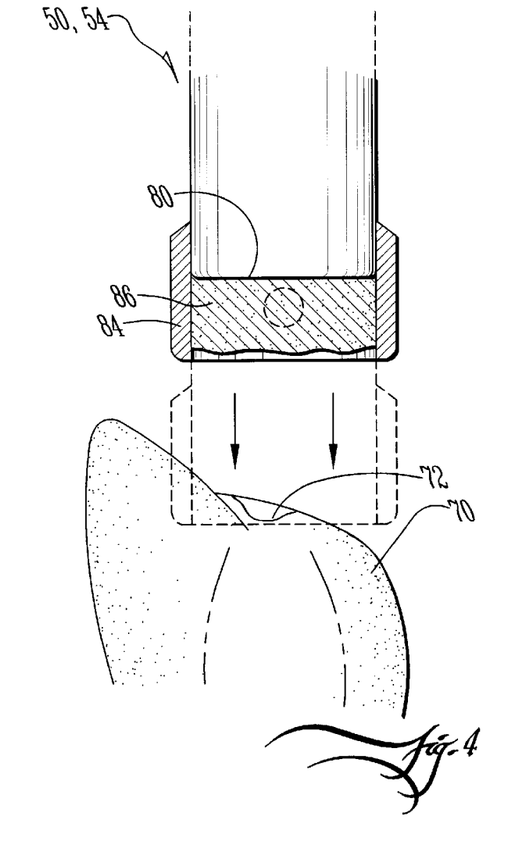
FIG. 4 is a partial sectional view taken through line IV—IV in FIG. 3, with portions broken away.
Figure 5:
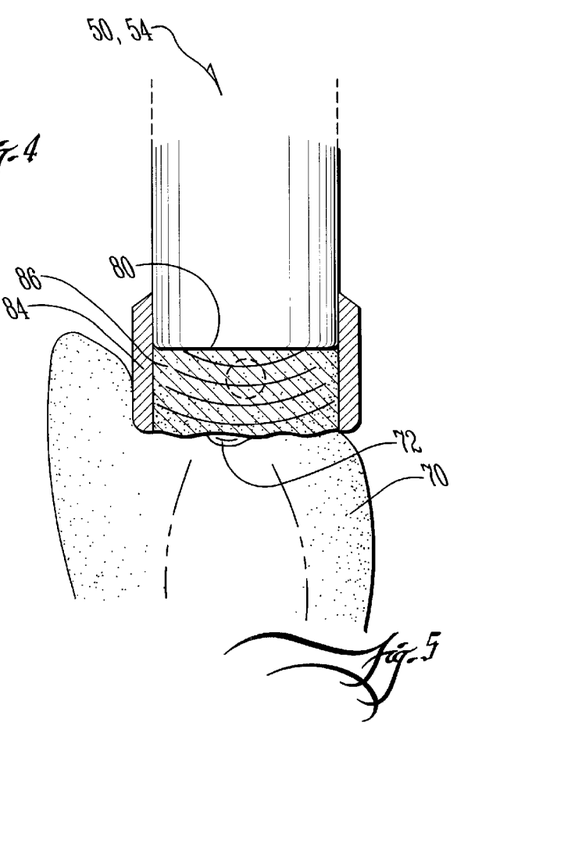
FIG. 5 is a partial sectional view comparable to FIG. 4 except showing the probe in an extension position for contacting the vent of the hatchling.

FIG. 3 shows aspects of ultrasound examination as performed by a contact probe 80 operating in pulse-echo mode. That is, the probe 80 is both the source of ultrasonic energy and the detector of echos thereof, which corresponds to the detected signal. Suitable ultrasound equipment for the purpose includes without limitation an analyzer and probe of the Ultramark 4A System. FIGS. 3 and 4 show the probe 80 in a retracted position. FIG. 5 shows the probe 80 in an extension position and in contact with the examination specimen 70. In FIG. 3, the specimen 70 hangs by its ankles from the ankle clips 55 as are known in the art. The clips 55 are controllable by the processor 58 to open and close in response to given signals. At an original time a worker manually hangs the specimen by its ankle in open clips 55. The clips 55 automatically or are manually operated to close. The ultrasonic examination can then take place, along with any microwave declawing process (if any).

FIG. 3 shows that the probe 80 is surrounded by a soft skirt 84 which is serviced with a supply of a flowable, intermediate medium 86 for acoustically coupling the probe 80 with the specimen 70. The medium preferably comprises without limitation K-Y® liquid of the McNeil corporation. In FIG. 3, the probe 80 is aimed directly at the soft underbelly of the specimen 70. FIG. 4 shows the probe 80 and its attached skirt 84 driven in an extension stroke. FIG. 5 shows the probe 80 disposed in contact with the specimen 70. The probe 80 and skirt 84 substantially cup the region of the vent 72 of the specimen 70 as shown. The skirt 84 forms a light seal. Lightly pressurized media 86 is injected inside the skirt 84. The media 86 fills the skirt 84 or at least partly fills the gap between the probe 80 and vent 72 (ie., between the probe 80 and the hatchling's cloaca 72). Excess media 86 is allowed to escape out the rim of the skirt 84. At this stage in the process, an ultrasonic inspection can be taken.

Figure 8:
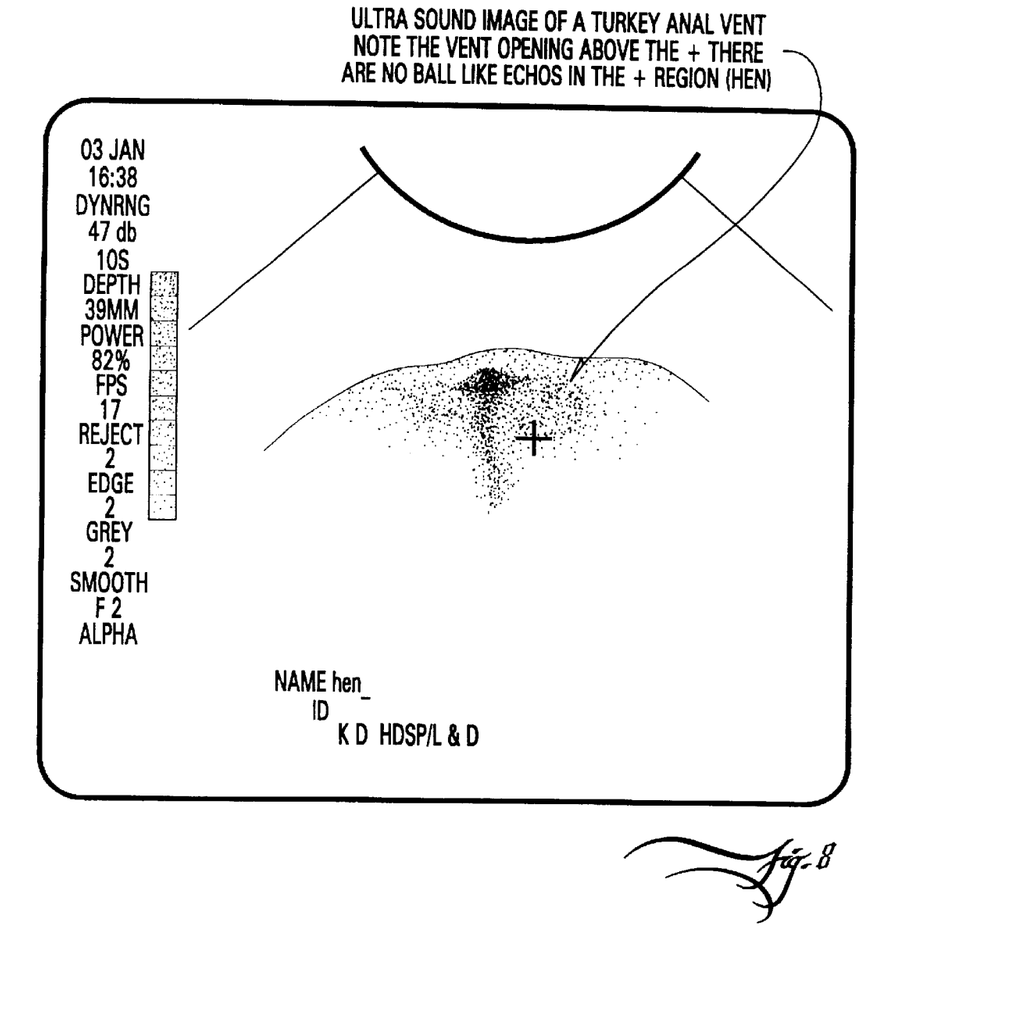
FIG. 8 is an ultrasound image comparable to FIG. 7 except showing the absence of the phallus which characterizes the avian hatchling as female.

FIGS. 7 and 8 show representative ultrasound images acquired by the method 50' in accordance with the invention. FIG. 7 shows the "tokki" or pertinent phallus structure of a male avian hatchling. FIG. 8 correspondingly shows an image characterized by the absence of such structure. Trials were conducted with the specimens of these two images as well as many others whose sex was verified by manual vent-sexing examinations.

It is an aspect of the invention to positively identify males by the pertinent phallus structure. FIGS. 7 and 8 are images shown by the attached display of the ultrasound analyzer (but indicated generally as part of one or more blocks 54 and 58 in FIG. 1). FIG. 7 shows the cross-hairs of a target ("+") located immediately below and a little to the left-of-center of the geometry of a double ball echo corresponding to a tom (ie., male turkey) hatchling. The active diameter of the probe 80 in FIG. 5 measures about a centimeter (~0.4 inches). The working frequency is about 7½ megahertz. The analyzer is adjusted in respect of time gain compensation to provide better resolution of interfaces close to the probe 80. Each ball of the double ball structure is about the size of the balls found in conventional ball point pens or, that is, they typically vary between about one-half (½) and two (2) millimeters in diameter. The double ball structure lies about three (3) millimeters under the surface of the tissue. In real time, the hatchling 70's vent 72 can be observed twitching open and close with rhythm like breathing. This phenomenon permits assurance that the vent 72 is positively located, albeit that this phenomenon is not depicted by the still frame image of FIG. 7. Given the assurance over the finding of the vent 72, the vent 72's periphery is searched for the presence or absence of the positive marker of males, or that is the tell-tale double ball structure as depicted in FIG. 7.

FIG. 8 shows the absence of any double-ball structure around any peripheral portion of the vent 72. Hence FIG. 8 is representative of a female specimen 70. It is an aspect of the invention that sex is most simply determined by positively identifying males, as is done with manual vent-sexing examinations which have a long history of high accuracy. Alternatively, the ultrasound inspection could be arranged to search for female gonad ovaries.

Figure 6:
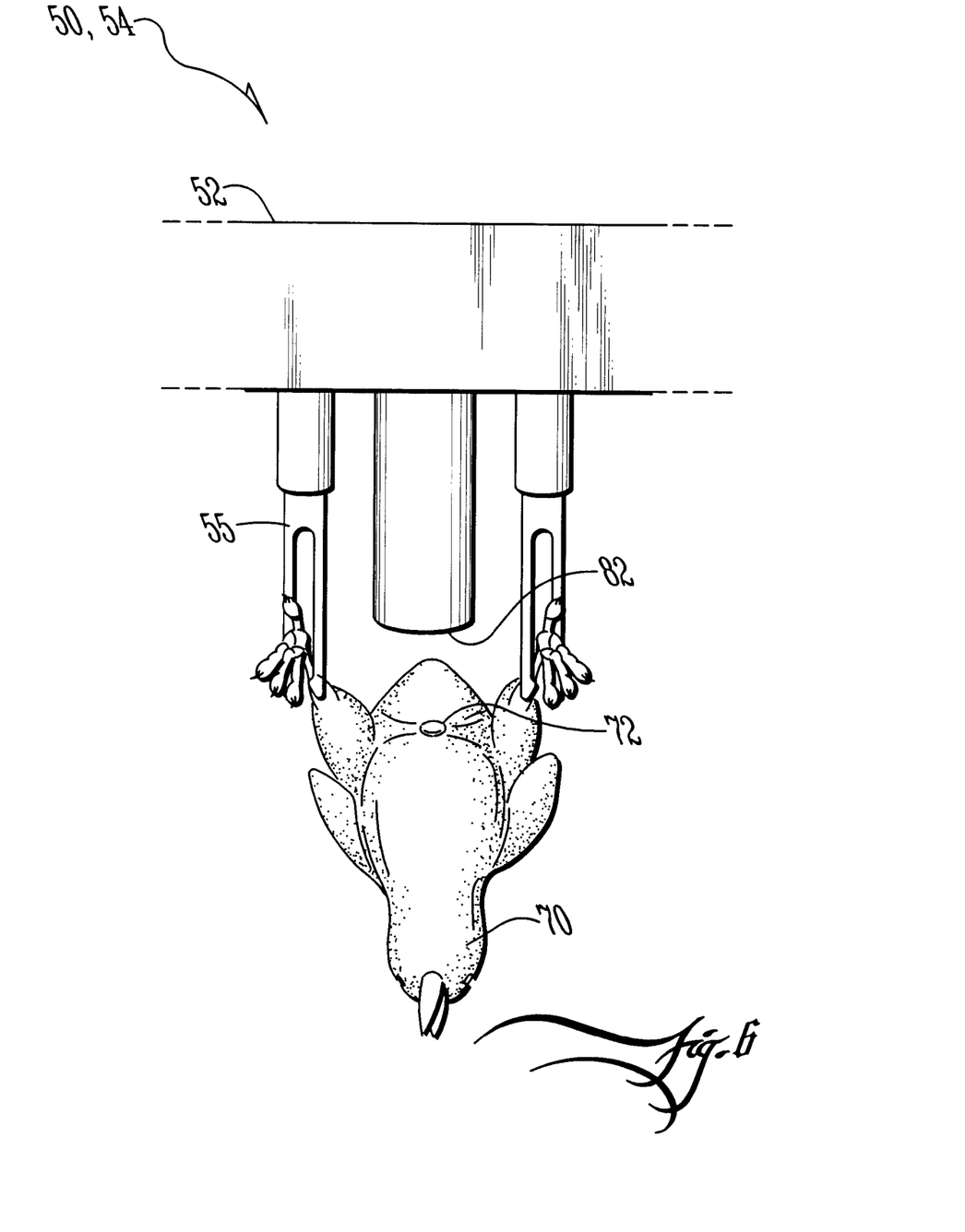
FIG. 6 is a perspective view comparable to FIG. 3 except showing a non-contact pulse-echo probe being both the source and detector of ultrasonic energy.

To turn back to FIG. 6, it shows a non-contacting probe 82 arranged for ultrasound inspection in a pulse-echo mode. That is, the probe 82 is both source of ultrasonic energy and detector of the echos thereof. Non-contact ultrasound is advantageous among other reasons, obviating the need to cycle a contact probe (eg., 80 in FIG. 4) through an extension and retraction stroke. An example non-contact probe 82 suitable for the purpose includes without limitation the model no. NCT 102 transducer of SecondWave Systems, Inc., State College, Pennsylvania., which transducers nominally have a planar 25 mm active area diameter. An example non-contact ultrasound signal analyzer suitable for the purpose includes without limitation model no. NCA-1000-2En also of SecondWave Systems, Inc., State College, Pennsylvania.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method for sorting avian hatchlings by gender comprising the steps of:

provi ding a plurality of avian hatchlings;

beaming ultrasonic energy at the vent or cloaca of each hatchling to produce a detectable signal from anatomical structure associated with the vent;

basing gender from analysis of the signal and sorting the avian hatchlings on that basis.

2. The method of claim 1 wherein the step of beaming ultrasonic energy comprises contacting a probe against the vent to operate in pulse-echo mode.

3. The method of claim 2 wherein the step of contacting the probe against the vent further includes providing an intermediate, flowable medium therebetween to eliminate air.

4. The method of claim 1 wherein the step of beaming ultrasonic energy comprises aiming a non-contact pulse-echo probe at the vent.

5. The method of claim 1 wherein the detectable signal is analyzed for the presence or absence of a characteristic of male gender.

6. The method of claim 5 wherein the characteristic of male gender comprises structure of the phallus.

7. The method of claim 1 wherein the plurality of the hatchlings are hung upside down from an apparatus provided with a source for beaming the ultrasonic energy at the vent and wherein the apparatus automatically sorts the hatchlings to respective output conveyors.

8. A method for sorting male and female avian hatchlings which comprises the steps of:

providing a plurality of the hatchlings;

providing an apparatus with a source of ultrasonic energy for examining the vent or cloaca of each hatchling; and based upon the examination, the apparatus automatically sorting the hatchlings.

9. The method of claim 8 wherein the source of ultrasonic energy examines the vent by disposing a contact pulse-echo probe against the vent.

10. The method of claim 9 wherein the step of disposing the contact pulse-echo probe against the vent further includes providing an intermediate, flowable medium therebetween to eliminate air.

11. The method of claim 8 wherein the source of ultrasonic energy examines the vent by aiming a non-contact pulse-echo probe at the vent.

12. The method of claim 8 wherein the step of examining the vent comprises examining for the presence or absence of characteristics of male gender.

13. The method of claim 12 wherein said characteristics of male gender comprises structure of the phallus.

14. The method of claim 8 wherein said apparatus automatically sorts the hatchlings to respective male and female output conveyors.

15. Apparatus for determining gender of avian hatchlings comprising:

retainer for retaining an avian hatchling in an examination position;

a source of ultrasonic energy targeted at the vent of the retained hatchling for producing an examination signal; and a processor for determining gender from the examination signal.

16. The apparatus of claim 15 wherein the processor includes services of an ultrasonic analyzer.

17. The apparatus of claim 15 wherein the source of ultrasonic energy comprises either a contact pulse-echo probe disposed against the vent or a non-contact pulse-echo probe spaced by a gap from the vent.

18. The apparatus of claim 15 wherein the processor determines gender by the presence or absence of characteristics of male gender.

19. The apparatus of claim 18 wherein said characteristics of male gender comprises structure of the phallus.

20. The apparatus of claim 15 wherein said apparatus automatically sorts the hatchlings to respective male and female output conveyors.

* * * * *